March 2, 1948.  E. F. ROSSMAN  2,436,901
HYDRAULIC SHOCK ABSORBER
Filed Sept. 13, 1945
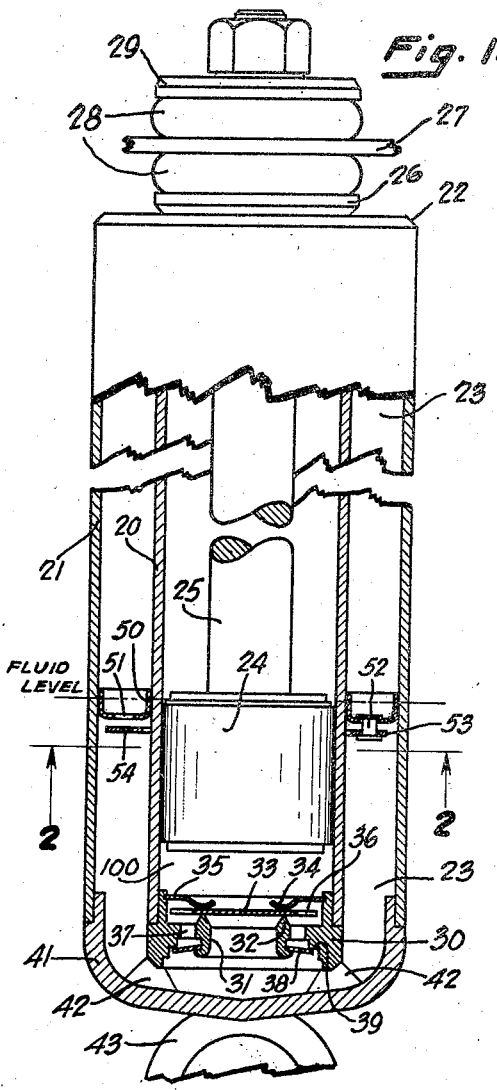
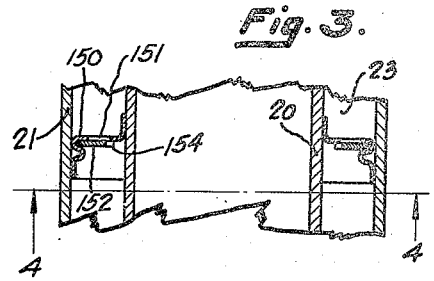
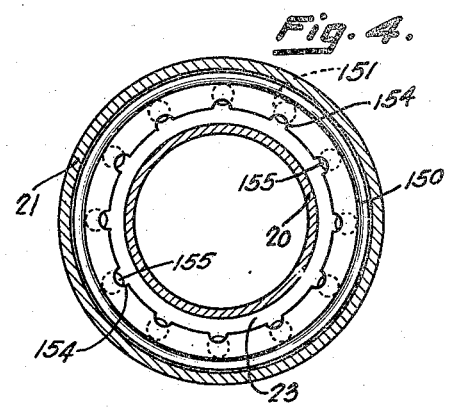
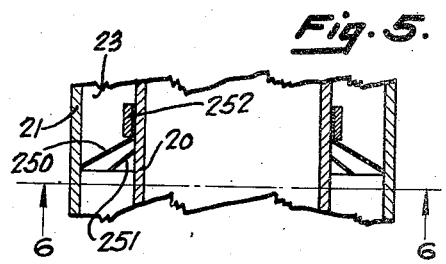
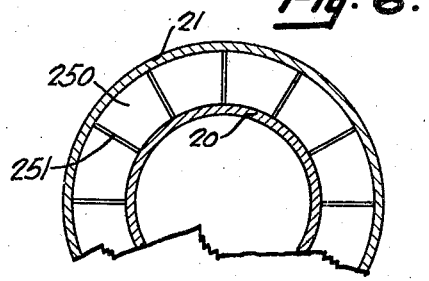
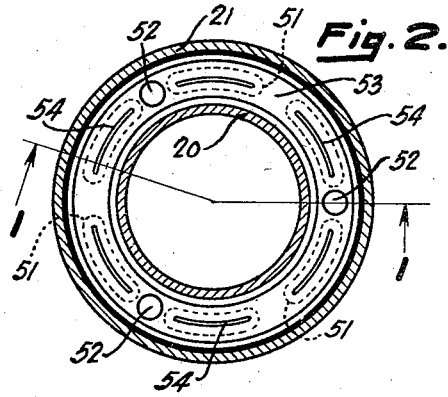
INVENTOR
EDWIN F. ROSSMAN
BY
HIS ATTORNEYS Patented Mar. 2, 1948

2,436,901

UNITED STATES PATENT OFFICE 2,436,901

HYDRAULIC SHOCK ABSORBER

Edwin F. Rossman, Dayton, Ohio, assignor to General Motors Corporation, Detroit, Mich., a corporation of Delaware Application September 13, 1945, Serial No. 615,997

3 Claims. (Cl. 188—88)

1

This invention relates to improvements in hydraulic shock absorbers.

It is among the objects of the present invention to provide an hydraulic shock absorber in which mixing of air and the fluid is reduced to a minimum.

A still further object of the present invention is to provide an hydraulic shock absorber in which a fluid, having substantially no air content, is acted upon by a reciprocating piston in a working cylinder whereby loss of control or lag at the start of piston movement, due to aeration of fluid, is substantially eliminated.

Further objects and advantages will be apparent from the following description, reference being had to the accompanying drawings, wherein a preferred embodiment of the invention is clearly shown.

In the drawings:

Fig. 1 is a fragmentary, sectional view of a shock absorber equipped with the present invention. This section is taken in the direction and along the line 1—1 of Fig. 2.

Fig. 2 is a transverse section taken along the line 2—2 of Fig. 1.

Fig. 3 is a fragmentary sectional view of a modified form of the invention.

Fig. 4 is a transverse sectional view taken along the line 4—4 of Fig. 3.

Fig. 5 is a view similar to Fig. 3 showing another form of the invention, and

Fig. 6 is a fragmentary, transverse section taken along the line 6—6 of Fig. 5.

Referring to the drawings, the shock absorber is shown comprising a pair of concentric tubular members 20 and 21 both secured to an upper, head member 22. Member 20 forms the cylinder of the device and the surrounding tubular member 21 forms the fluid reservoir 23. Within the cylinder 20 there is provided a reciprocative piston 24 having the usual fluid flow passage and valves (not shown) for establishing and controlling fluid flow from one side of the piston to the other as it is reciprocated in the cylinder. A piston rod 25 has one end secured to piston 24 and slidably extends through a packed bearing in the head member 22, having the anchoring member 26 secured to its end which extends to the exterior of the head member. The anchoring member 26 is secured to the plate 27 which is one of the two relatively movable members controlled by the shock absorber. Rubber grommets 28 are interposed between plate 27, the member 26 and the clamping disc 29.

At the bottom end of the cylinder 20 there is

2 provided a closure or head member 30 having a central opening 31 surrounded by an annular valve-seat 32 extending into the cylinder 20. A disc-valve 33 is urged upon the valve-seat 32 by resilient fingers 34 formed in a disc-ring 35 secured in the member 30. Valve 33 has recesses 36 cut in its periphery to allow the free passage of fluid past the valve, portions of which lie in close proximity to the inner wall of the head member for guiding purposes.

The closure member 30 has a plurality of openings 37 arranged in a circular row around the valve-seat 32. A resilient ring, disc-valve 38 has its inner annular edge secured to the closure member 30 so as to flex said disc-valve and urge its outer portion against the annular shoulder 39 formed on the closure member. Normally this valve 38 shuts off communication between the passages or openings 37 and the fluid reservoir 23.

A cap 41 has an annular recess in which the tubular member 21 is seated to secure it to said cap. Lugs 42 in said cap provide a seat for the end head member 30 while providing a space under said member in communication with the fluid reservoir 23. Any suitable anchoring extension 43 is provided on cap 41, by means of which this end of the shock absorber may be attached to the other relatively movable members whose movements are to be controlled by the shock absorber.

The piston 24 is of the standard design having fluid passages providing for the transfer of fluid from one side of the piston to the other in response to reciprocation thereof. Any type of standard fluid flow control valves are associated with the piston passages so that if desired the flow of fluid in one direction through the piston is restricted to a greater degree than in the other. The type of valving and control in the piston does not enter into this invention and therefore no particular valve mechanism is shown in the drawings.

The present shock absorber is particularly designed to control the movements of the frame and axles of a vehicle. When so used, the piston rod 25 is attached to the frame of the vehicle represented by the number 27. The tubular member 21 forming the fluid reservoir 23, and its cap 41 and anchorage 43 are secured to the vehicle axle. When the vehicle is operated over a roadbed the wheels on the axle, striking irregularities in the roadbed, will cause the fluid containing tube 21 to be shaken vigorously much in the manner of a cocktail shaker when in use.

This results in agitation of the fluid within the reservoir tube 21 causing it to mix with the air also present in the reservoir. As the reservoir tube 21 is thrust suddenly upwardly as the vehicle wheel strikes a bump in the roadbed, fluid in the reservoir will be urged downwardly. Then when the wheel suddenly drops from the bump, due to the action of the springs of the vehicle, between the axle and frame thereof, the sudden downward thrust of the tube 21 downwardly will cause an upward surge of the fluid in the reservoir. Rapid repetitions of these movements will cause agitation of the fluid in the reservoir and a resulting aeration thereof.

To have substantially instant shock absorber control it is necessary to have substantially solid or airfree fluid in the cylinder. If air-charged fluid is introduced into the working chamber 100 of the cylinder, the piston, on its stroke toward the end head member 30 will first compress the air in the fluid thereby causing a lag in the proper resistance to movement offered by the shock absorber. A substantially air-free fluid in the working chamber presents an uncompressible medium for resisting immediately the compression movement of the piston and thereby eliminating the lag mentioned.

To reduce fluid agitation and thereby minimize fluid aeration, the present invention provides a fluid movement controlling means in the reservoir which tends to hold the substantially solid or airfree fluid in the reservoir, in the vicinity of the cylinder intake valve 33. Several forms of the invention are shown in the drawings. Referring particularly to Figs. 1 and 2, the means for controlling the movement of fluid in the reservoir comprises a partition or baffle 50 in the form of a ring which is secured between the concentric tubes 20 and 21 at or below the minimum level of the fluid in the reservoir. The baffle 50 has a plurality of openings 51 providing for the transfer of fluid from one side of the baffle to the other. Other holes are provided in the baffle, said holes receiving rivets or studs 52 which loosely support the ring-shaped disc valve 53, normally in spaced relation with the baffle. Valve 53 has a plurality of slits 54 so spaced as to coincide with the openings 51 in the baffle. These slits reduce the fluid flow capacity of the openings 51 in one direction so that when fluid movement upwardly causes the valve 53 to be moved on standards 52 to engage the partition or baffle 50, this upward movement of the fluid from the lower side of the baffle to the upper will be substantially restricted. Thus, when the tube 21 is suddenly thrust upwardly, the resultant downward movement of the fluid in the reservoir will cause the valve 53 to be moved into its normal position as shown in Fig. 1, thereby permitting substantially unrestricted passage of the fluid through the openings 51 of the baffle. As a result, the comparatively air-free or solid fluid is urged toward the bottom of the reservoir and into the vicinity of the cylinder intake valve 33. On the other hand, when the tube 21 is suddenly thrust downwardly, the upward surge of the fluid, in consequence thereto, will move valve 53 up against the baffle 50 thereby reducing the openings 51 from full capacity flow to the flow capacity of the slits 54 in valve 53. This restricts the upward movement of the fluid through the baffle 50 and into the area of fluid agitation where air is mixed with the fluid. The restriction to fluid movement offered by the slits 54 in valve 53 is substantially less than the restriction offered by valve 38 to the flow of fluid from the working chamber 100 into the reservoir 23 in response to movement of the piston 24 toward member 30. Thus valve 53 does not enter into the control of fluid flow to vary the resistance offered by the shock absorber.

Figs. 3 and 4 and Figs. 5 and 6 show modified forms of fluid movement control devices in the fluid reservoir which function to provide the same results as does the device of Figs. 1 and 2.

In Figs. 3 and 4, the baffle 150 is secured between tubes 20 and 21. It has a series of openings 151 providing for the substantially unrestricted flow of fluid from one side of the baffle to the other. A flexible, ring-shaped disc valve 152 has its outer peripheral edge secured to the partition or baffle 150 so that normally the valve flatly rests against the baffle as shown in Fig. 3. The inner peripheral edge of valve 152 has a series of semi-circular notches 154 equal in number and similarly spaced as openings 151 so that normally a space 155 is provided at each opening which restricts the flow of fluid through said openings in one direction.

Figs. 5 and 6 show the baffle in the form of a frustoconically shaped member 250 made of any suitable thin flexible material. The hub portion of the baffle is secured to the cylinder 20 by a ring 252 while the outer peripheral edge engages the interior wall of the tube 21. Slits 251 divide the baffle into flexible segmental portions and also provide fluid restricting passages which restrict the flow or movement of fluid from the under to the upper side of the baffle. Downward movement of the fluid urges the outer edges of the segments away from the tube 21 to provide for a substantially free flow of fluid from the top side to the lower side of the baffle.

From the aforegoing it may clearly be seen that the present invention provides a fluid dampening baffle partition in the reservoir at or beneath the level of the fluid therein, said partition having means operative to allow the fluid to pass downwardly through or around the baffle partition substantially freely in response to sudden upward thrusts of the shock absorber. However, passing of the fluid through or around the baffle partition in the opposite direction in response to sudden downward thrusts of the shock absorber is substantially restricted so that the fluid is substantially prevented from passing freely from the reservoir section adjacent the intake valve to the cylinder into the upper portion of the reservoir where the presence of air tends to aeration of the fluid resulting from the violent shaking of the shock absorber during operation of the vehicle to which it is attached. This assures the presence of substantially air-free fluid in the working chamber of the cylinder and thus immediate control and resistance by the shock absorber.

While the embodiment of the present invention as herein disclosed, constitutes a preferred form, it is to be understood that other forms might be adopted, all coming within the scope of the claims which follow.

What is claimed is as follows:

1. An hydraulic shock absorber comprising a cylinder; a piston in said cylinder; a fluid reservoir surrounding and in communication with said cylinder; fluid flow controlling means between the cylinder and reservoir; and means fixed in the reservoir, below the minimum fluid level therein, for restricting the movement of fluid in the reservoir to a greater degree in one direction than in the other.

2. An hydraulic shock absorber comprising a cylinder; a piston in said cylinder; a reservoir; an end member for the cylinder, said end member having openings connecting the cylinder with the fluid reservoir; valves for controlling the fluid flow through said opening; and means fixed in the reservoir for restricting the movement of fluid in the reservoir away from said end member to a greater degree than the fluid movement toward said end member.

3. An hydraulic shock absorber comprising, a cylinder; a piston in said cylinder; a fluid reservoir; a cylinder end head having a plurality of passages connecting the cylinder with the reservoir; a valve for one of said passages providing for a substantially unrestricted flow of fluid from the reservoir into the cylinder; a valve for the other of said passages, providing for a restricted flow of fluid from the cylinder into the reservoir; and fluid movement controlling means fixed in the reservoir, for restricting the movement of fluid in the reservoir away from said valves to a greater degree than the movement of the fluid in the reservoir toward said valves.

EDWIN F. ROSSMAN.

REFERENCES CITED

The following references are of record in the file of this patent:

UNITED STATES PATENTS

| Number | Name | Date |
|---|---|---|
| 2,122,407 | Chisholm | July 5, 1938 |
| 2,329,803 | Whisler | Sept. 21, 1943 |
| 2,379,750 | Rossman | July 3, 1945 |

FOREIGN PATENTS

| Number | Country | Date |
|---|---|---|
| 705,634 | Germany | May 5, 1941 |